United States Patent [19]
Gomada

[11] 3,802,927
[45] Apr. 9, 1974

[54] APEX SEAL FOR ROTARY PISTON ENGINE AND METHOD OF PRODUCING SAME

[76] Inventor: Nobuyasu Gomada, Hiroshima, Japan

[22] Filed: Dec. 16, 1971

[21] Appl. No.: 208,747

Related U.S. Application Data

[62] Division of Ser. No. 71,752, Sept. 14, 1970, Pat. No. 3,658,451.

[52] U.S. Cl. ............... 148/4, 148/35, 148/138, 219/121 L, 219/121 P
[51] Int. Cl. ............................. C22c 37/00
[58] Field of Search ........ 418/113, 178, 179; 148/1, 148/2, 3, 4, 35, 138, 141; 219/121 L, 121 P

[56] References Cited
UNITED STATES PATENTS

| | | | |
|---|---|---|---|
| 3,033,180 | 5/1962 | Bentele | 418/179 X |
| 3,318,515 | 5/1967 | Jones | 418/178 X |
| 1,941,423 | 12/1933 | Weber | 148/141 |
| 2,968,723 | 1/1961 | Steigerwald | 148/13 |
| 3,231,430 | 1/1966 | Krieger et al. | 148/4 |
| 3,650,846 | 3/1972 | Holland et al. | 148/13 X |

FOREIGN PATENTS OR APPLICATIONS

| | | | |
|---|---|---|---|
| 240,446 | 8/1962 | Australia | 219/121 P |
| 340,530 | 12/1930 | Great Britain | 148/141 |

*Primary Examiner*—Charles N. Lovell

[57] ABSTRACT

An apex seal for a rotary piston engine, the apex seal being made of cast iron and having an elongated shape, a roundish sliding surface, said apex seal comprising a hardened portion including the sliding surface with a chilled structure containing a large proportion of cementite and a non-hardened portion with at least one-third of the height of the seal and with no chilled structure; and a method of producing the same.

10 Claims, 7 Drawing Figures

APEX SEAL FOR ROTARY PISTON ENGINE AND METHOD OF PRODUCING SAME

This is a division, of application Ser. No. 71,752 filed Sept. 14, 1970, now U.S. Pat. No. 3,658,451.

This invention relates to a cast iron made apex seal for rotary piston engine. More particularly, it relates to an apex seal whose surface has been treated to form a hardened layer of chilled structure containing a large proportion of cementite and which is in sliding contact with the inner surface of a casing that houses the seal, and a method of producing the same.

The apex seal for a rotary piston engine is fitted at the apex of the rotary piston and is adapted to make a planetary motion with the piston while being pressed against the inner surface of the casing by the combined action of elastic force of springs disposed behind the apex seal, gas pressure in the operating chamber and centrifugal force produced by rotation of the piston. As mentioned above, it moves in sliding contact with said inner surface of the casing while maintaining the air-tightness therebetween. Therefore, the apex seal used for this purpose must be one which has excellent mechanical properties as well as high wear and heat resistance and which also does not produce an excessive wear of the inner surface of the casing and wavy abnormal abrasion, that is, so-called chatter marks. Thus depending upon what quality the apex seal has, it will exert a serious influence on the performance and durability of the engine and cannot, therefore, be selected simply from the standpoint of wear resistance unlike the ordinary mechanical parts.

The present inventors have made extensive studies on the material of apex seal and have found that the most excellent apex seal, which does not produce any chatter mark on the inner surface of the casing and satisfies the various requirements for an apex seal, can be produced by making a seal from cast iron and treating the seal to form a hardened layer containing a large amount of cementite, or so-called chilled structure, in the upper part thereof including its sliding surface. This hardened layer of cementite, popularly called as chilled structure, is a form of ledeburite of cementite ($Fe_3C$) or a mixture form of ledeburite and pro-eutectic cementite. As is well known, in the manufacture of conventional, ordinary mechanical parts, there is used a method of rapidly cooling a molten iron for the parts by the so-called chilling effect of a chiller during the casting operation thereby allowing the cast iron to have a chilled structure only at a specific surface thereof. If there is also used such a method in manufacturing very small and thin mechanical parts such as apex seals of this invention, the whole body of a molten iron for the parts will quickly be cooled to form the parts made of cast iron having a chilled structure throughout it, with consequent reduction of their strength. Thus it is almost impossible to obtain desired chilled structure exclusively at the sliding surface of such small and thin mechanical parts. It may also occur to cut out an apex seal from a large cast iron block having a chilled surface. However, since mottled cast iron is always present below a chilled portion, it is also almost impossible to cut out an apex seal which is chilled exclusively at the sliding surface from any portion of the block. For these reasons, it has been considered technically unattainable to obtain a cast iron made apex seal having a chilled structure exclusively at its sliding surface, and hence the apex seal such as proposed in the present invention has never been thought of in the art.

According to the present invention which has been achieved from such standpoint, there is provided a process for producing a desired apex seal comprising the steps of first preparing an elongated cast iron made blank material having a width equal to or slightly larger than that of the final product apex seal, then subjecting the top surface portion of said blank material to application of electron beam, arc, laser light or plasma to cause rapid melting of the material, while moving the blank in its longitudinal direction at a constant velocity and oscillating the beams at a constant amplitude in a direction perpendicular to the moving direction of the blank then rapidly cooling the molten part by chilling effect of the non-molten part, and finally giving final working thereto with or without previous stress-relieving heat treatment to thereby form a hardened layer of chilled structure containing a large amount of cementite at the sliding surface of the apex seal which surface is slidingly contacted with the inner surface of the casing.

The apex seal obtained according to the present invention is formed with a hardened layer of cementite to the depth of several mm below its sliding surface without inviting substantially any impairment of mechanical and physical properties of the base cast iron material and is provided with various characteristics, particularly excellent wear resistance, required for an apex seal used in a rotary piston engine. Further, the cementite of the hardened layer is extremely stable even under high temperature atmosphere within the engine and the excellent impact decrement characterized by the cast iron of which the seal is made, prevents chatter marks (abnormal abrasion) from occurring, so it is possible to maintain the initial seal performance unchanged for a long time.

Now the present invention will be described in detail by way of its preferred embodiments with reference to the accompanying drawings, in which.

Figure 1:
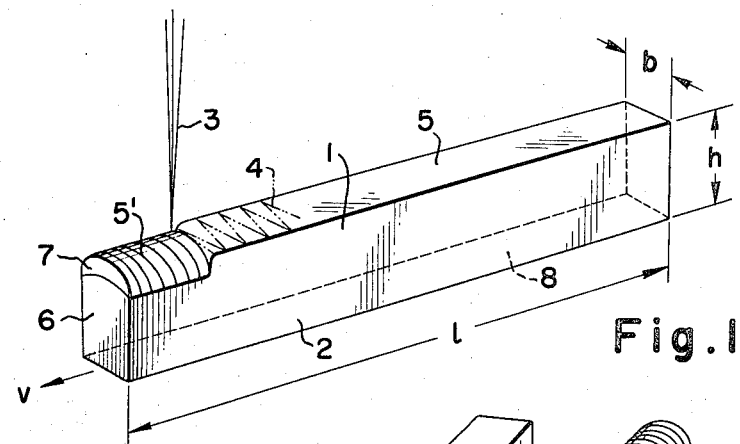
FIG. 1 is a perspective view illustrating a manner in which electron beam is applied.

Referring first to FIG. 1, it will be appreciated that an elongated cast iron blank 1 having a width $b$ equal to or slightly larger than the width of the final product apex seal is prepared either by shaping from a cast mass or by cutting from a cast iron plate, cast iron block or the like. In this case, the width b is of an extent in which final work allowance of the side 2 of the blank 1 is included, while the length dimension l is one which corresponds to the length of one or several or more pieces of apex seal combined. The term "elongated" as used herein is not limited in its meaning to a single apex length. The cast iron material used may be of any type in which chilling can be performed, including ordinary cast iron, alloy cast iron, nodular graphite cast iron, malleable cast iron and others which are involved within the general category of cast iron. If desired, the cast iron material may be subjected previously to refining heat treatment.

Then, blank 1 is placed in an electron beam radiator in which electron beams 3 are applied in a suitable manner to the top surface 5 of blank 1 which is travelling longitudinally at moving velocity V. Application of electron beams may be conducted, for example, by projecting said beams continuously and swingingly in a direction perpendicular to the longitudinal axis of blank 1 such as to describe a zigzag trace 4, thereby to melt the blank material down to the depth of several mm below the surface 5 of said blank. Instead of using electron beams, it is also possible to utilize arc, laser light, plasma or other means which can achieve quick melting in a short time.

In this case, the non-molten portion 6 produces an effect similar to that obtained when a chiller is attached, and the molten portion 7 is rapidly cooled by this chilling effect, resulting in formation of a chilled structure, namely, a hardened layer containing a large amount of cementite. It is to be noted that suitable selection of moving velocity of blank and electron beam radiating conditions will allow the top surface 5' of said blank to assume by itself after soldification a roundish configuration closely resembling the desired top surface of the final apex seal product due to surface tension of molten cast iron bath. Of course, the top surface 5 of blank 1 may be previously chamferred or otherwise worked into a desired roundish configuration. In either way, it is possible to form the top surface 5' into a roundish configuration. It is also possible to increase the chilling effect by enlarging the height h of blank 1 more than necessary. Further, the above-said melting operation may be conducted while cooling the non-molten portion with suitable cooling means, for example, by attaching a well heat conductive chiller such as a copper plate to the side 2 and bottom surface 8 of said portion.

In this manner, a hardened layer 9 containing cementite in abundance is formed at the top surface, and then the structure, after or without stress-relieving heat treatment, is subjected to final working such as cutting or grinding to thereby produce a desired apex seal. It should be noticed that since the top surface is already shaped into a roundish configuration in a previous step, it is possible to greatly save the time required for finish grinding of the top surface. This is one of the important advantages of the method of the present invention.

Figure 2:
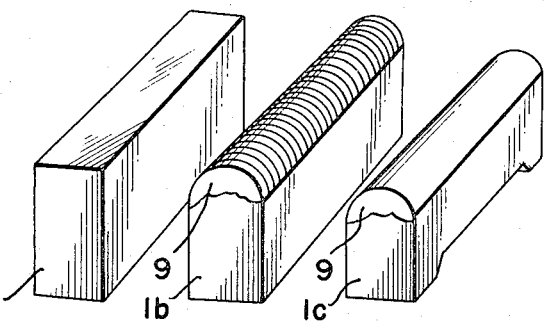
FIG. 2 is a perspective view illustrating external appearance in each step of the apex seal manufacturing process according to an embodiment of the present invention.

In FIG. 2 are shown external appearances that show up on the blank after each step in the instant embodiment. Blank material 1a, which is initially prepared, is worked in next step into an intermediate or half-made article 1b having at its top surface a rounded hardened layer 9, and then this intermediate article 1b is subjected to finish work to form a final apex seal product 1c.

Although the foregoing discussion has been concentrated on an integrated type apex seal, it will be understood that a split type apex seal can also be produced in the same manner, this seal being of the same type as the known split type.

EXAMPLE 1

An elongated intermediate blank 1a, which is rectangular in section and has a size of 6.5 (b) × 12 (h) mm and a length (l) of 70 mm, was prepared from nodular graphite cast iron (FCD 55 — refer to G5502 of Japanese Industrial Standards) as shown in FIG. 2. The prepared blank was put in a welding chamber in an electron beam welder with an output of 1.25 KW and electron beams were applied to said blank under the following conditions:

| | |
|---|---|
| Degree of vacuum | $5 \times 10^{-4}$ Torr. (mmHg) |
| Acceleration voltage | 25 KV |
| Beam current | 22 mA |
| Electromagnetic lens current | 58 mA |
| Blank feeding velocity | 32 mm/min |
| Beam amplitude | 6.5 mm |
| Beam amplitude period | 2 sec/cycle |

The top surface of the blank is instantaneously melted at a temperature of approximately 1,500° C by the irradiation of electron beam. The thus-melted portion is then soldified in several seconds after the irradiation due to a chilling effect of the non-melted portion to form a hardened layer.

Figure 3:
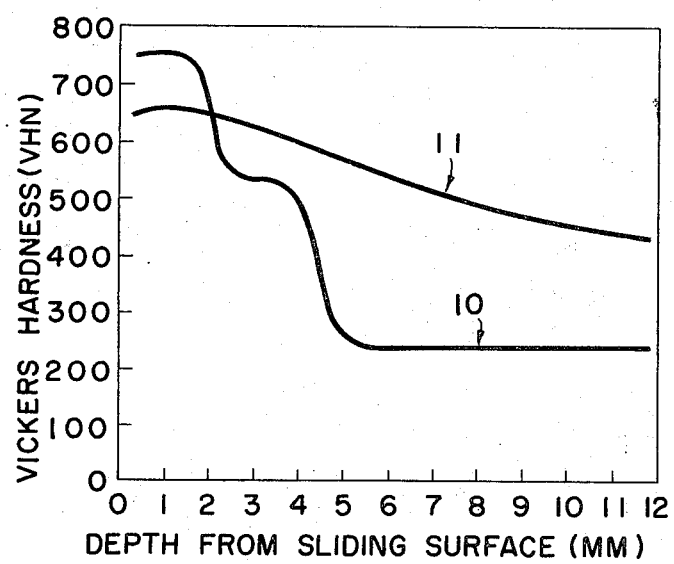
FIG. 3 is a diagram showing transition of hardness below the sliding surface of the above-said apex seal, in comparison with a trial product obtained according to a conventional method where a chilling effect is used at the time of casting.
Figure 4:
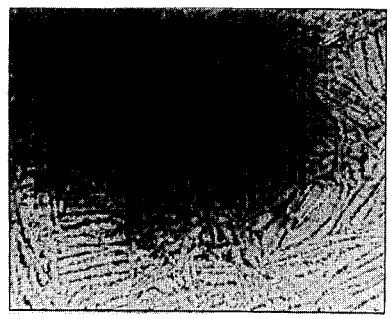
FIGS. 4 and 5 are the 100 times magnified microphotographs showing respectively the structures of the hardened layer and the boundary section in the apex seal produced according to the first embodiment.
Figure 5:
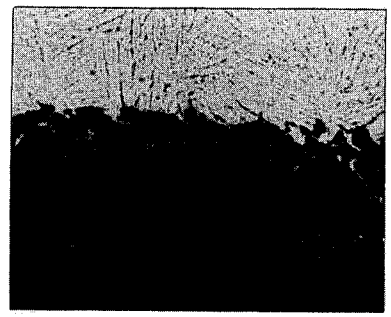
Figure 6:
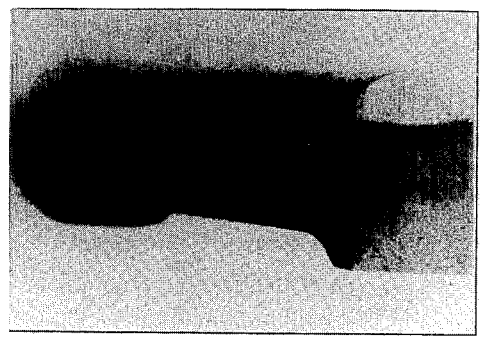
FIG. 6 is a thrice-magnified photograph of an end face of an apex seal produced according to the first embodiment of the present invention.

The top surface of the intermediate blank 1b after electron beam application, as shown in FIG. 2, had a roundish configuration closely resembling the shape of the sliding surface of the final apex, so that finish grinding work on the final top surface was completed in an extremely short time, and as a result, a 6 × 10 × 60 mm apex seal 1c having at its sliding surface a hardened layer 9 containing a large proportion of cementite was obtained. The end face of the produced apex seal as shown in FIG. 6 had a clearly visible hardened layer 9 (in FIG. 2), and this hardened layer, as shown in FIG. 4, had an extremely compact, perfectly chilled structure having Vickers hardness (VHN) of 780. FIG. 5 is a photograph showing the structure at the boundary section. Structural difference between the hardened layer and the base material of the apex seal is obvious from FIG. 5. Transition or gradient of hardness below the sliding surface of the thus obtained apex seal 1c is shown by a curve 10 in FIG. 3. As compared with hardness transition curve 11 of a trial product according to a conventional method using chiller at the time of casting, no impairment of characteristics of the base material is observed in the product of the present invention.

The apex seal produced by the conventional method has Vickers hardness of about 660 at the sliding surface, but the hardness is gradually lowered in proportion to the distance from the sliding surface. Hardness at the bottom surface is also as high as more than 450 in VHN. This means that the apex seal is chilled in its entirety and that its mechanical strength is too lowered to stand practical use. Whereas, the apex seal according to Example 1 of the present invention has high hardness of more than 750 (VHN) at the sliding surface and to the depth of about 2 mm below said sliding surface, but hardness is sharply reduced as the distance from the sliding surface is increased up to about 5 mm below the sliding surface. Thereafter, however, hardness remains substantially constant at 250 (in VHN), or same value as that of base material, through the thickness down to the bottom. These facts dictate that the apex seal of Example 1 of the present invention has a sliding surface which maintains always high hardness during use even if it is abraded, and that the characteristics of base material in the lower half of the apex seal are not the least impaired, allowing maintenance of mechanical strength sufficient to stand practical use. In the present invention, sliding surface hardness of more than 550 in VHN is sufficient for use, and best result is obtained when said hardness is more than 700. It is also desirable that the portion of at least one-third of the height of the apex seal remains unchanged or original in hardness and it has hardness of less than 400 in VHN.

In connection with the above-mentioned irradiating conditions, the feeding rate of a blank may correspondingly be lowered if the beam current is decreased, and the frequency of beam oscillation may be increased if the feeding rate of the blank is lowered. The amplitude of the electron beam is determined depending upon the width of a desired apex seal and is desirable to be approximately equal to, or somewhat small than, the width of the desired apex seal. The conditions under which the electron beam is irradiated, widely vary with the size of a desired apex seal. The preferable conditions are as follows:

| | |
|---|---|
| Vacuum | $1 \times 10^{-4} - 5 \times 10^{-2}$ Torr. (mmHg) |
| Beam current | 15 – 60 |
| Feeding rate of a blank | 25 – 75 mm/min |
| Frequency of beam oscillation | 0.5 – 3.5 sec/cycle |

EXAMPLE 2

Similar steps to those in Example 1 were followed under the same conditions as in Example 1 but by using common cast iron (FC 25 — refer to G5501 of Japanese Industrail Standards) to obtain an apex seal of the same size and configuration as those of the product in the previous example. The hardened layer was a perfect chilled structure having hardness of 720 (VHN).

EXAMPLE 3

This was prepared a blank 1a for apex seal consisting of 3.7% C, 2.3% Si, 0.35% Mn, 0.5% Cr, 1.0% Ni, 1.5% Mo, 0.9% Cu and the balance comprising Fe and incidental elements such as P, S and the like, from an acicular cast iron which is known as an alloy cast iron. The blank 1a had the same size and shape as the one in Example 1. The blank was subjected to electron beam irradiation under the same conditions as in Example 1. It had hardness of 370 VHN before the irradiation and had hardness of 900 VHN at its hardened layer after the irradiation. The irradiated blank was then subjected to stress-relieving heat treatment for about 2 hours with the result that it decreased from 900 to 750 VHN in hardness at its hardened layer and remained the same as the original hardness of 370 VHN at its lower portion. The blank was subsequently given final working to obtain a desired apex seal therefrom. If stress-relieving heat treatment or stress relief tempering is effected in the above-mentioned step, it will be effective in preventing the hardened layer from breaking during the final working and also in preventing the layer from changing in hardness due to the temperature of an engine in which the apex seal obtained is fitted.

Figure 7:
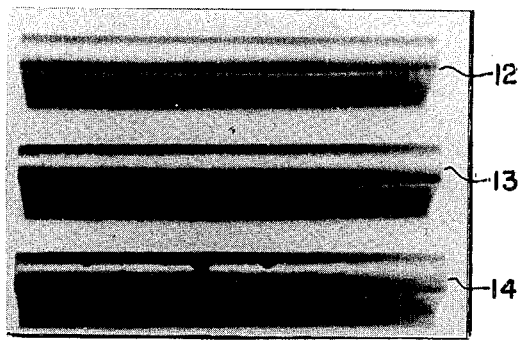
FIG. 7 is a photograph showing the conditions of the sliding surfaces, just after the bench tests, of the apex seals according to the first and second embodiments of the present invention, in comparison with that of a conventional carbon-type article.

Then, three apex seals obtained in Example 1 were incorporated in the front side piston in a known 2 and 3 lobe type NSU-Wankel rotary piston engine of 491 cc × 2 piston system, while three prior art apex seals prepared by impregnating carbon sintered articles with aluminium were incorporated in the rear side piston in the same engine. In the same manner, three apex seals obtained in Examples 2 and 3 three above-said prior art apex seals were incorporated in the respective pistons in other two engines of the same type as said above. And these three rotary piston engines were subjected to bench test under full load of 6,000 rpm (95 ps) for duration of 300 hours in succession. This bench test is equivalent to about 50,000 km actual running. During operation, completely no trouble was witnessed, and overhall tests of the engines after operation showed that both the casing applied with hard Cr plating and the apex seals of the present invention suffered no abnormal abrasion and were quite satisfactory. The post-operation conditions on the sliding faces of the apex seals of Examples 1 and 2 and of the prior art are shown in FIG. 7, by numbers 12 to 14, respectively. In Table 1 below are shown the amounts of abrasion that was observed on the respective apex seals and casings after the test.

The apex seals of Examples 1, 2 and 3, which had been subjected to the above test, were again incorporated in still another engine of the same type and were subjected to additional 100-hour test operation by varying rotational frequency of the engine. The results showed no abnormality and suggested ability for practical use.

Table 1

| Engine No. | Apex Seal | | Abrasion loss in casing |
|---|---|---|---|
| | Classification | Abrasion rate ($\mu$/H) | |
| | | Sliding surface | End face | |
| 1 | Example 1 | 0.5 | 0.01 | max. 8$\mu$ |
| 2 | Prior art | 1.8 | 0.06 | max. 6$\mu$ |
| 3 | Example 2 | 0.7 | 0.01 | max. 8$\mu$ |
| 4 | Prior art | 1.8 | 0.08 | max. 7$\mu$ |
| 5 | Example 3 | 0.3 | 0.01 | max. 8$\mu$ |
| 6 | Prior art | 1.8 | 0.08 | max. 7$\mu$ |

As evident from FIG. 7 and Table 1 above, the apex seals according to Examples 1, 2 and 3 of the present invention showed high superiority in abrasion resistance over the conventional carbon type products, and also the casings in which the apex seals of the present invention were mounted suffered less abrasion loss. It was also confirmed that the devices of the present invention bring about remarkable improvement over the problem of reduction of gas sealing ability due to abrasion of end faces observed in the conventional carbon type or specific cast iron type products. The Table also shows that the apex seal prepared from the acicular cast iron has better performance probably because said cast iron is superior in wear resistance and impact decrement.

As discussed above, the method for producing apex seals for rotary piston engine according to the present invention comprises substantially the steps of preparing an elongated cast iron made blank having a width equal to or slightly larger than that of the final apex seal product, rapidly melting the top surface of said blank by application of electron beams or by other suitable means, then quickly cooling the molten portion by chilling effect of the non-molten portion, and finally subjecting same to suitable final works with or without previous stress-relieving heat treatment to thereby form a hardened layer of chilled structure containing a large amount of cementite at the sliding surface of the apex seal which is slidingly contacted with the inner surface of the casing. Thus, according to the present invention, a large amount of cementite can be integrally formed on the body cast iron material without impairing the characteristics of the latter to produce a structure having combined characteristics of said both materials, so that the resultant product has excellent properties such as strength, abrasion resistance, heat resistance and so forth required for practical use, as well as stabilized quality. The apex seal according to the present invention can best be adapted in a chrome-plated casing. Usually, a hardened layer of this type is so hard that it sometimes proves difficult to exercise cutting or grinding operation. However, according to the method of the present invention, final finish grinding or cutting operation can be completed in an extremely short time since the top surface of the blank after melting has already a configuration very near to the final shape of the sliding face of the finished apex seal. This, coupled with inexpensiveness of blank material, allows manufacture of the desired apex seals at low cost. Thus, the present invention can be very highly appraised for its industrial utility.

What is claimed is:

1. A method of producing a cast iron apex seal for a rotary piston engine having a roundish sliding surface at the top and having a hardened portion with a hardened chilled structure containing a large proportion of cementite, of Vickers hardness not less than 550, this portion including the sliding surface and a non-hardened portion without a chilled structure occupying at least one-third of the seal in height, having a Vickers hardness not more than 400, comprising preparing an elongated cast iron blank for an apex seal, rapidly melting with an electron beam, arc, laser light or plasma energy beam the top of the blank while moving the blank in its longitudinal direction at a constant velocity and oscillating the beam at a constant amplitude in a direction perpendicular to the moving direction of the blank, the upper portion of the blank including the top being rapidly melted while at least one-third of the seal in height remains unaffected, quickly cooling and solidifying the molten portion by the non-molten portion of said blank having a chilling effect thereon, and then machining the heat-treated blank to obtain the apex seal having the desired shape and size.

2. A method according to claim 1 wherein the blank is further subjected to stress-relieving heat treatment prior to the machining thereof.

3. A method according to claim 2 wherein the as prepared blank is substantially rectangular in sectional shape.

4. A method according to claim 1 wherein the rapid melting of the upper portion of the blank is effected by irradiating electron beams on the top surface of the blank, said electron beams being applied under the following conditions:

| | |
|---|---|
| degree of vacuum | $1 \times 10^{-4} - 5 \times 10^{-2}$ Torr. |
| beam current | 15 – 60mA |
| moving velocity of the blank | 25 – 75 mm/min. |
| frequency of beam oscillation | 0.5 – 3.5 sec./cycle |

5. The method according to claim 1 wherein said beam being applied to the top of the blank describes a zigzag trace thereon.

6. The method according to claim 1 wherein the chilling effect of the non-melted portion is reinforced by application of a well heat conductive chiller to the non-melted portion of the blank.

7. The method according to claim 6 wherein said chiller is a copper plate.

8. The method according to claim 1 wherein the prepared blank is substantially equal to the desired apex seal in wisth and substantially rectangular in sectional shape, and the top of the blank acquires after solidification, a roundish configuration closely resembling the desired sliding surface of the final apex seal product.

9. The method according to claim 1 wherein said cast iron is refined prior to preparation of the blank.

10. The method according to claim 1 wherein said top surface of the blank has a roundish configuration prior to melting.

* * * * *